No. 834,563. PATENTED OCT. 30, 1906.
W. COOPER.
ELECTRIC MOTOR CONTROL SYSTEM.
APPLICATION FILED MAY 22, 1905.
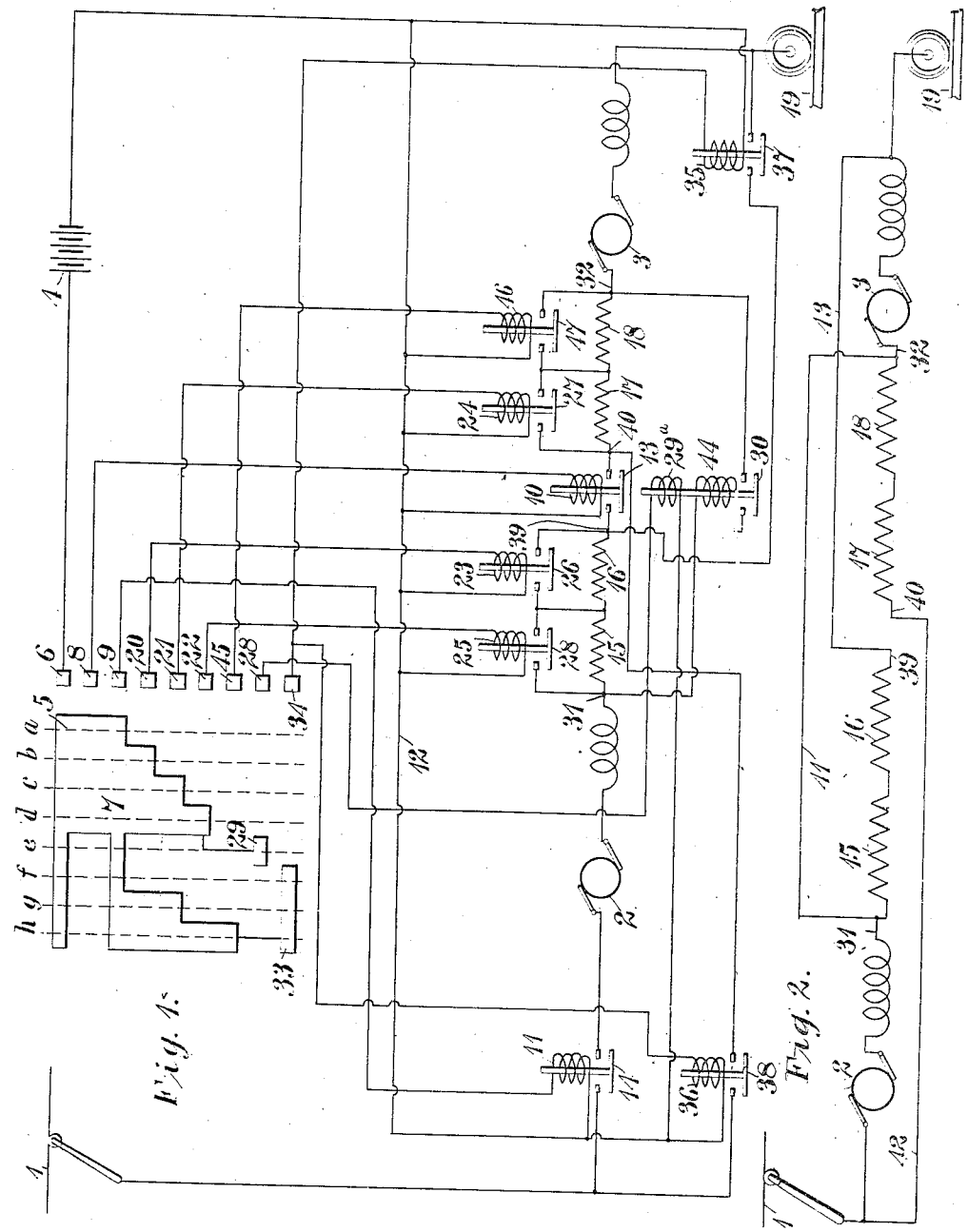
WITNESSES:
Fred H. Miller
R. J. Dearborn
INVENTOR
William Cooper
BY
Wesley G. Carr
ATTORNEY

UNITED STATES PATENT OFFICE.

WILLIAM COOPER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR-CONTROL SYSTEM.

No. 834,563.

Specification of Letters Patent.

Patented Oct. 30, 1906.

Application filed May 22, 1905. Serial No. 261,615.

*To all whom it may concern:*

Be it known that I, WILLIAM COOPER, a citizen of the United States, and a resident of Wilkinsburg, in the county of Allegheny and State of Pennsylvania, have invented a new and useful Improvement in Electric Motor-Control Systems, of which the following is a specification.

My invention relates to systems of electric motor control, and has special reference to systems that are adapted for railway-service.

The object of my invention is to provide, in connection with an auxiliary control system, means for automatically changing from a series connection of the motors of the equipment to a multiple connection of said motors without involving an increase or diminution of motor-currents.

In the prior art it has been customary in controlling a two-motor railway-vehicle equipment to connect the motors in series with each other and with a predetermined resistance, then to gradually decrease the resistance, then to connect the motors in multiple circuit with the resistance again inserted, and, finally, to gradually cut out the resistance. To accomplish this result in connection with an auxiliary control system and to utilize the same resistance without applying excessive currents to the motors, a bridge-circuit has been employed which short-circuited the resistance, leaving both motors in series and allowing the multiple connection to be completed before the bridge-circuit was broken. This bridge-circuit, however, was often broken when carrying a considerable current, which produced a destructive arc and caused a certain fluctuation of current on the motors. To obviate these disadvantages, my invention provides means for holding such a bridge-circuit closed until the resistance in the multiple paths may be varied to give a balanced or no-current condition on the bridge-circuit when the circuit is automatically opened without causing substantially any variation in the motor-currents.

My invention is illustrated in the accompanying drawings, in which—

Figure 1 is a diagrammatic view of a system constructed in accordance therewith, comprising, for convenience, a two-motor equipment governed by a hand-operated master-controller. Fig. 2 is a diagram of connections of the motors shown in Fig. 1 at the time when the connections are about to be changed from series to parallel relation.

I desire that my invention shall not be confined or restricted to any specific arrangement, for it may, and probably will, be applied to a three or a four motor equipment arranged for series and multiple operation in either direction and may embody either automatic acceleration or hand-operated master-switch control, as shown.

Referring to the drawings, direct-current electrical energy is supplied from a positive line-terminal 1 to a plurality of motors 2 and 3, which may be governed by an auxiliary system supplied with energy from a storage battery 4 and controlled by a hand-operated master-switch 5, that may occupy any one of a plurality of positions $a$, $b$, $c$, $d$, $e$, $f$, $g$, and $h$ When the master-controller 5 occupies the position $a$, energy is supplied from the battery 4, through contact-finger 6, contact-segment 7, contact-fingers 8 and 9, windings 10 and 11, to negative-battery line conductor 12. As current flows through the windings 10 and 11 switches 13 and 14 are closed, which completes the main circuit from the positive line-terminal 1, through switch 14, the motor 2, a resistance member that is subdivided into sections 15 and 16, the switch 13, another similar resistance member comprising sections 17 and 18 and the motor 3 to the negative line conductor 19. Thus the two motors 2 and 3 are connected in series across the line with the entire resistance 15 16 17 18 in series with them.

As the master-controller 5 occupies successively the positions $b$, $c$, and $d$, the contact-fingers 20, 21, and 22 are supplied with energy from the battery 4, through contact-segment 7, which they successively engage. A circuit is completed from fingers 20, 21, and 22 through windings 23, 24, and 25, to the negative-battery line conductor 12, by reason of which the switches 26, 27, and 28 are closed and resistance-sections 16, 17, and 15 successively short-circuited.

As the master-controller is moved to the position $e$ a contact-finger 28 is brought into engagement with a segment 29 and energy is supplied through the finger 28 to the winding 29$^a$ of a solenoid-switch 30, the other terminal of the winding 29$^a$ being connected to the negative-battery line conductor 12. The energizing of the winding 29ª closes the switch 30, which completes a bridge-circuit from a terminal 31 of the motor 2 to a terminal 32 of the motor 3 and completely short-circuits all of the resistance-sections 15 16 17 18. The fingers 8, 20, 21, and 22 are out of engagement with the segment 7 when the master-controller 5 occupies position e, so that windings 10, 23, 24, and 25 are deënergized and the corresponding switches 13, 26, 27, and 28 are opened.

The opening of the switch 13 divides the resistance members, leaving sections 15 and 16 connected to the motor 2 and sections 17 and 18 connected to the motor 3.

As the master-controller 5 is moved to the position f energy is supplied through a contact-segment 33, which is connected with the contact-segment 7, contact-finger 34, and windings 35 and 36 to negative-battery conductor 12. The energizing of the windings 35 and 36 closes the switches 37 and 38 and connects a terminal 39 of the resistance-sections 15 16 with the negative line terminal 19 and the terminal 40 of the resistance-sections 17 18 with positive line conductor 1. The main motor-circuit connections at this point are more simply illustrated in Fig. 2, the auxiliary control-circuits being omitted.

Referring particularly to Fig. 2, four possible paths from the positive line conductor 1 to the negative line conductor 19 are provided, one through motor 2, the bridge-circuit 41, in which the switch 30 is located, and the motor 3 to conductor 19. In this path it is obvious that the current will tend to flow through the conductor 41 from the terminal 31 to the terminal 32.

A second path is provided through a conductor 42, in which the switch 38 is located, through resistance-sections 17 18, the bridge-circuit 41, resistance-sections 15 16, and a conductor 43, in which the switch 37 is located. In this path it is evident that the current tends to flow through the bridge-circuit 41 from the terminal 32 of the motor 3 to the terminal 31 of the motor 2, which is opposite to the tendency of the flow in the first path.

A third path is provided from the conductor 1 through the motor 2, the resistance-sections 15 16, and the conductor 43 to the negative conductor 19, and a fourth path is provided from the positive line 1, through conductor 42, resistance-sections 17 18 and the motor 3 to the negative line conductor 19.

It is evident that if the resistance to the flow of current that is exerted by the motors 2 and 3 when in operation is equal to that which is exerted by the resistance-sections 15 16 17 18 no current will flow through the bridge-circuit 41 in either direction, since the tendency to flow in one direction is equal to the tendency to flow in the other direction. Under such conditions the current will all flow through the third and fourth paths and the two motors will be connected in multiple circuit across the line with a resistance member in series with each one, and as no current will flow through the conductor 41 this path may be broken without danger of arcing or fluctuation of motor-currents. This relation of equivalent resistances may be difficult to obtain in practice, but it will be readily seen that if the total resistance of the sections 15 16 17 18 is greater than that exerted by the motors 2 and 3 a certain amount of current will flow through the bridge-circuit 41 in one direction, and if the resistance exerted by the sections 15 16 17 18 is less than that exerted by the two motors current will flow through the bridge-circuit 41 in the opposite direction. In order to make use of this relation, the resistance members may be so constructed as to have a greater value than the resistance exerted by the two motors and part of the resistance may be cut out until its value becomes less than that of the two motors. As the resistance is cut out the current through the bridge-circuit 41 will pass through a zero value.

The switch 30 in the bridge-circuit 41 is provided with a second winding 44, which is connected in series with the circuit, so that when once the switch 30 is closed by energizing of the magnet-winding 29ª the winding 44 is energized to retain the switch 30 in the closed position as long as any current flows through the circuit 41. As the master-controller 5 is moved to the position f the finger 28 moves out of engagement with the contact-segment 29, so that the bridge-circuit 41 may not be opened until the current flowing therethrough reaches a zero value, which is attained by the reduction of the resistance, as hereinbefore explained. This reduction of the resistance is accomplished as the master-controller 5 moves to the position g, when contact-fingers 20 and 21 again engage the contact-segment 7 and supply energy to the magnet-windings 23 and 24, which closes the switches 26 and 27 and short-circuits the resistance-sections 16 and 17, as before. After this resistance is cut out and the circuit 41 is opened the motors 2 and 3 are connected in multiple circuit, the resistance-section 15 being in series with the motor 2 and resistance-section 18 in series with the motor 3. Then as the master-controller is moved to the position h, which is the full running position for the equipment, contact-finger 22 and the contact-finger 45 move into engagement with the ring-segment 7 and energize the magnet-windings 25 and 46, closing the switches 28 and 47, which short-circuit the resistance-sections 15 and 18, leaving the motors directly across the line in parallel.

Variations in the details of devices and circuit connections that do not materially change the mode of operation or the result are within the scope of my invention.

I claim as my invention—

1. The combination with a plurality of electric motors and an auxiliary control system which is governed by a master-controller to regulate the connections thereof and the amount of resistance in circuit therewith, of means for successively connecting the motors in series and in parallel, with resistance in series with each, and means for automatically opening the series connection between said motors when no current is flowing therethrough.

2. The combination with two electric motors and an auxiliary control system which is governed by a master-controller to regulate the connections thereof and the amount of resistance in circuit therewith, of means for successively connecting the motors in series, without resistance, and in parallel, with a similar resistance in series with each, and for varying said resistances simultaneously, and means for automatically opening the series connection between the motors when no current is flowing therethrough.

3. The combination with a plurality of electric motors and a control system comprising a master-controller and a plurality of unit-switches, of means for changing the motors from a series to a multiple-circuit connection without involving any variation of the motor-currents, that comprises a bridge-circuit which connects the motors in series without resistance in circuit, and means for automatically opening said bridge-circuit after multiple connections have been completed, with resistance in series with each motor, and when no current is flowing therethrough.

In testimony whereof I have hereunto subscribed my name this 16th day of May, 1905.

WILLIAM COOPER.

Witnesses:
C. E. BEDELL,
BIRNEY HINES.